United States Patent [19]

Gedye

[11] 4,421,644

[45] Dec. 20, 1983

[54] FILTER HOUSING

[75] Inventor: Laurence R. Gedye, Doncaster East, Australia

[73] Assignee: L.R. & N.R. Gedye Pty. Limited, Australia

[21] Appl. No.: 293,086

[22] Filed: Aug. 17, 1981

[30] Foreign Application Priority Data

Aug. 15, 1980 [AU] Australia ............................ PE5057

[51] Int. Cl.³ ............................................ B01D 35/02
[52] U.S. Cl. ..................................... 210/233; 210/169;
210/232; 210/416.2; 210/462
[58] Field of Search ............... 210/169, 232, 233, 238,
210/416.2, 461, 462

[56] References Cited

U.S. PATENT DOCUMENTS

| 2,782,161 | 2/1957 | Willinger | 210/416.2 |
| 3,132,364 | 5/1964 | Oxley | 210/169 |
| 3,362,537 | 1/1968 | Cline | 210/169 |
| 3,595,398 | 7/1971 | Cook | 210/462 |
| 3,864,261 | 2/1975 | Masterjoseph | 210/169 |
| 4,107,043 | 8/1978 | McKinney | 210/462 |
| 4,186,093 | 1/1980 | Willinger | 210/169 |

FOREIGN PATENT DOCUMENTS 841371 7/1960 United Kingdom ................ 156/92

Primary Examiner—Ernest G. Therkorn
Attorney, Agent, or Firm—Wigman & Cohen

[57] ABSTRACT

A one piece moulded blank to be folded to form a filter housing. The blank comprising a main rectangular shaped panel having a number of spaced transverse grooves forming fold lines so the main panel may be folded to form the side walls of the housing. Two end panels formed integral with the main panel and projecting from respective opposite edges of the main panel. Grooves extend along the junction of each end panel to the main panel to form fold lines so the end panels may be folded to form the end walls of the housing. Interlocking elements formed integral with the main and end panels to interlock when the panels are folded to hold the panels in the relationship to form the housing.

6 Claims, 3 Drawing Figures

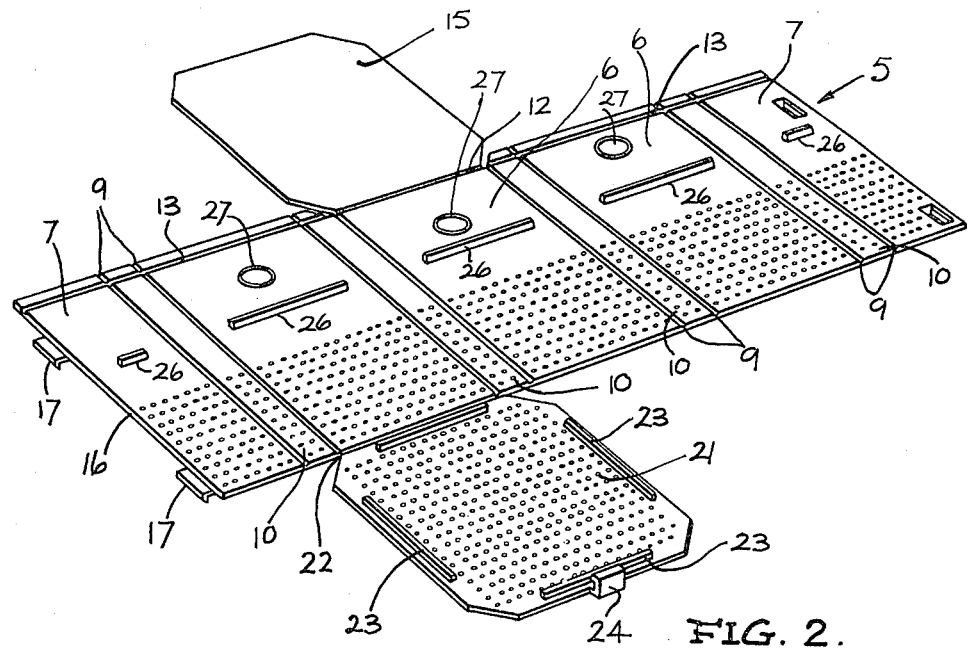
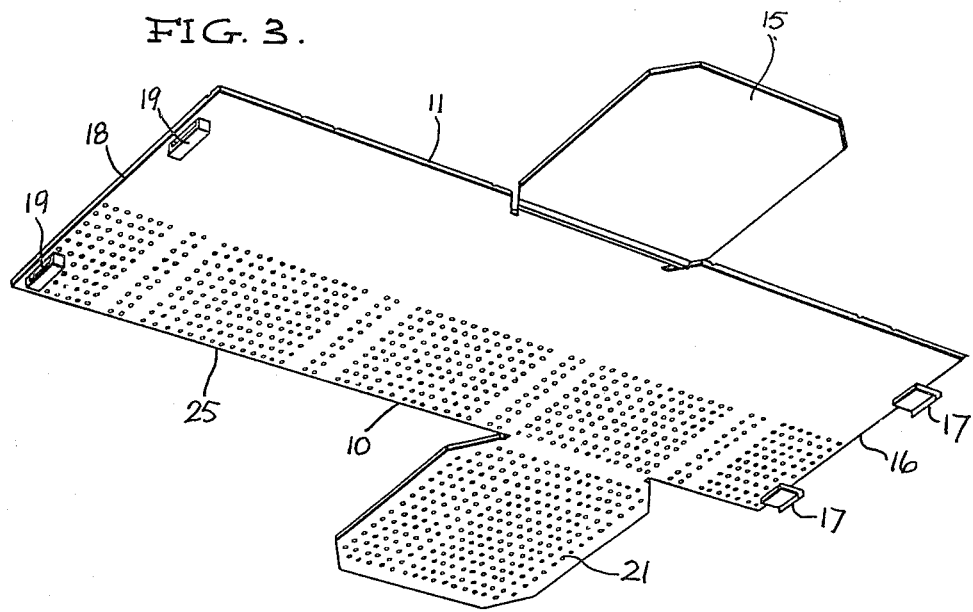

FILTER HOUSING

This invention relates to an improved filter housing for use in conjunction with circulated liquids, and particularly for filters used in fish tanks and garden or decorative pools.

Various constructions of filters are known however they are generally relatively costly to produce and accordingly are not particularly suitable for use in domestic situations such as fish tanks, decorative pools and the like. In these applications, normally the circulation pump is of comparatively low power and accordingly in order to reduce the loss through the filter, it should present a comparatively large filter area. Also as these filters normally operate in a totally immersed condition, minor leakage from the housing is acceptable and thus it is desirable to avoid the additional manufacturing costs involved in producing a completely leak-proof housing.

It is therefore the principal object of the present invention to provide a filter housing which is relatively inexpensive to manufacture, requires a minimum of maintenance and is effective in operation.

With this objective in view, there is provided by the present invention a moulded filter housing blank, comprising a generally rectangular main panel having at least three parallel fold lines formed in one face of the main panel extending transversely across said one face between the opposite longitudinal edges thereof, whereby upon folding along said fold lines, the main panel forms the perimeter side walls of the filter housing, engagable latching elements adjacent each end of the main panel to be engaged when the main panel is folded to form said side walls of the filter housing and maintain the main panel so folded, two end panels each of a shape corresponding to the cross section of the filter housing, said end panels being formed integral with the main panel on respective longitudinal edges thereof, a longitudinal fold line formed along the junction between the main panel and the respective end panels whereby upon folding the end panels along said respective fold lines, they form the opposite end walls of the filter housing, said main panel and end panels inter-locking when all are in the folded condition to constitute the filter housing, and an array of perforations in at least the main panel to permit entry of liquid to the housing.

Preferably, there are provided at least three pairs of transverse fold lines, the lines of each pair being relatively closely spaced. In this way when the main panel is folded to form the housing, each corner of the housing is formed by a pair of fold lines and hence each fold line is only required to accommodate half the angle of the corner. It will be appreciated that each corner of the end panels will be chamfered to match the shape of the corner formed as a result of the paired arrangement of the fold lines.

Conveniently the array of perforations extends over substantially the length of the main panel and half the width of the main panel. If desired, perforations may also be provided in the end panel joining the perforated portion of the main panel.

Conveniently, the main panel may be produced in the unperforated portion with one or more annular shaped weakened areas, any one of which may be pressed out in use to provide an aperture to receive a suitable connection to a circulation pump or system. The annular weakened areas may be of different diameters to suit connection to different size conduits and/or may be located at different distances from the end of the housing, again to suit different circulation systems.

By constructing the housing in the form above described, the side and end walls of the housing can be produced in a single moulding operation and then subsequently folded and held in the folded condition by the latching elements to form the housing. There is thus a minimum amount of labour involved in the production of the housing and such labour as is required is not highly skilled. Also the production of the housing as a one-piece flat moulding facilitates storage and transportation and even enables the housings to be marketed in an unerected condition.

As filter housings are intended to be used in a totally submerged environment, it is not necessary for the walls to be completely sealed to prevent the leakage of liquid or air into the housing which, again, reduces the manufacturing costs.

One practical arrangement of the filter housing is illustrated in the accompanying drawings wherein:

FIG. 2 is a perspective view of the panel from which the housing is formed looking on that face of the panel which forms the inner surface of the housing.

FIG. 3 is a perspective view of the panel shown in FIG. 2 from the opposite side.

Figure 1:
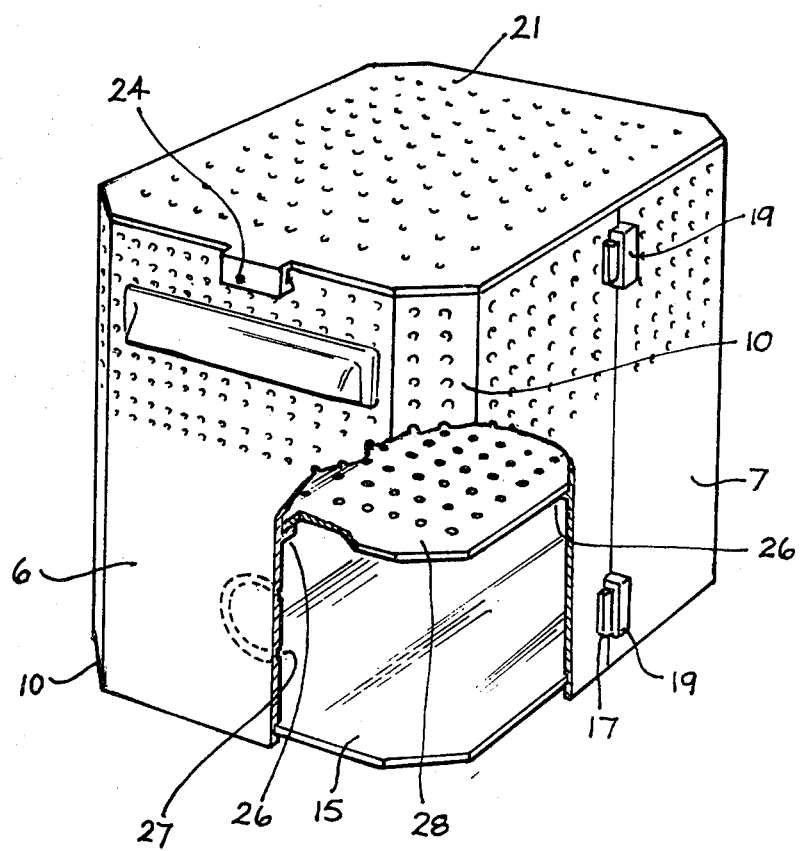
FIG. 1 is a perspective view party in section of the filter housing in the erected condition.

As can be seen in FIG. 1, the housing is of a substantial rectangular shape with each corner cut off or chamfered so as to be inclined at 45° to the two adjacent sides.

Referring now to FIG. 2, the panel 5 is moulded from a plastic material having a degree of flexibility in thin sections such as polypropylene, and is a basically rectangular shape. The panel 5 is divided into a total of five sections, three central sections 6 of equal size, and two end sections 7, which together are substantially the same size as the central panels 6. Between each panel are respective pairs of grooves 9, formed on the internal face of the panel 5, and extending the full transverse width thereof. Between the grooves 9 of each pair there are defined corner sections 10. The grooves 9 are of a V shape and reduce the thickness of the panel along the length of the groove so that the panel may be folded along the line of the groove.

The end panel 15, which forms the base of the housing when erected, is integral with the central one of the panels 6, and is joined thereto along the line of the groove 12 which is of the same form as the grooves 9 referred to above. Spaced a small distance from the longitudinal edge 11 of the panel 5, and extending from each end of the groove 12, is a groove 13, extending the remainder of the length of the panel 5. The groove 13 is of U shape and of a width to receive the edge portion of the end panel 15. Thus when the end panel 15 is folded into a position at right angles to the adjoining panel 6, the remaining panels 6,7 and 10 when folded will receive the respective edge portion of the end panel 15 in the respective portions of the groove 13.

On the end edge 16 of one of the small panels 7 there are provided a pair of hook elements 17 whilst adjacent the end edge 18 of the other small panel 7 there are provided two stirrup elements 19. The hook element 17 may be inserted through the stirrup elements 19 into an interlocking relationship when the panels 6, 7 and 10 have been folded so as to hold the panels in the folded state and to hold the edges 16 and 18 in an abutting relationship.

The other end panel 21 is joined along the opposite longitudinal edge 20 of one of the side panels 6, with a groove 22 therebetween, similar to the grooves 9 and 12 so that the end panel 21 may be folded to a position at right angles to the panel 6. Lugs 23 are provided adjacent each of the edges of the end panel 21, spaced inwardly therefrom a distance approximately equal to the thickness of the panel 5. The external dimensions of the end panel 21 are such that it overlies the edges of the panels 6, 7 and 10 when folded. Accordingly when the panel 5 is folded about the end panel 15 and the hook elements 17 engaged with the stirrup elements 19, the lugs 23 will assist in locating the upper ends of the panels 6, 7 and and 10 relative to the end panel 21. The hook element 24 co-operate with a lip 25 to lock the end panel 21 in position when the housing is fully erected.

The end panel 21, and the adjacent portion of the panel 5 across approximately half the width thereof, is provided with a series of perforations to permit the free-flow of liquid into the housing when the housing is immersed in the liquid.

A series of projecting lugs 26 are provided along a common longitudinal line, one on each of the panels 6 and 7, to provide a support for the divisional panel 28 (as seen in FIG. 1) in the housing, which is also perforated over substantially the whole of its surface to permit the free passage of liquid therethrough. A mass of filter material such as an open cell foam plastic is supported on this divisional panel 28 so that liquid entering the housing passes through the filter material before passing through the perforations in the divisional panel.

The annular grooves 27 formed on the inner surface of the panels 6 provide weakened areas to facilitate subsequent removal of the circular sections defined by the groove, so that the conduit may be secured to the housing for subsequent connection to a pump which draws liquid through the filter housing.

As previously stated a filter housing of the above construction may be simply erected during the manufacturing stage and if required, may be transported in an unfolded flattened stage with a substantial space saving. In addition it will be appreciated that the housing may at any later stage be partly or fully knocked down into the flattened condition such as for ease of cleaning and then re-erected.

I claim:

1. A filter unit having a filter housing adapted to be erected from a flat blank and disassembled to said flat blank, comprising a plurality of side walls and two opposite end walls defining a housing, said end and side walls being moulded as a one-piece flat blank having fold lines dividing said one-piece moulded blank into said side and end walls, said blank comprising a generally rectangular main panel having at least three parallel fold lines formed in one face thereof and extending transversely across said one face between opposite longitudinal edges thereof, said main panel being foldable along said fold lines to form the side walls of the filter housing, engageable latching elements adjacent each end of the main panel and adapted to be engaged to maintain the main panel folded to form said side walls of the filter housing, said latching elements being disengageable so that the filter housing may be knocked down into a flattened condition, two end panels each of a shape corresponding to the cross-section of the filter housing, said end panels being formed integral with the main panel on respective longitudinal edges thereof, a longitudinal fold line formed along the junction between the main panel and each of the respective end panels, the end panels being foldable along said respective fold lines forming the opposite end walls of the filter housing, said main panel and end panels being interlocked in the folded condition to constitute the filter housing, a division panel having perforations therein supported within the housing on lugs formed integral with the main panel and extending inwardly from respective side walls of the housing, said division panel being adapted to divide the interior of the housing into first and second chambers, perforations in at least one wall forming the first chamber to permit entry of liquid to the first chamber, and a filter element in the first chamber through which liquid entering the first chamber passes as it flows from the first chamber to the second chamber through the perforated division panel.

2. A filter unit as claimed in claim 1, wherein the longitudinal fold line between one of the end panels and main panel is spaced inwardly from the longitudinal edge of the main panel, a recess extending from each end of said fold line to the respective ends of the main panel and parallel to said longitudinal edge of the main panel, the perimetrical edge of said one end panel being seated within said recess with said one end panel folded along said longitudinal fold line and with the other side panels folded about the perimetrical edge of said one end panel.

3. A filter unit as claimed in claim 2 wherein the main panel is provided with a plurality of pairs of said transverse fold lines, the fold lines of each pair being parallel and the pairs of folded lines being arranged so that each pair form a chamfered corner between adjacent side walls of the housing.

4. A filter unit as claimed in claim 2 including at least one annular shaped weakened area in one side wall, whereby upon fracturing said weakened area an aperture is formed in said side wall to communicate with the second chamber.

5. A filter unit as claimed in claim 1 wherein the main panel is provided with a plurality of pairs of said transverse fold lines, the fold lines of each pair being parallel and the pairs of folded lines being arranged so that each pair form a chamfered corner between adjacent side walls of the housing.

6. A filter unit as claimed in claim 1 including at least one annular shaped weakened area in one side wall, whereby upon fracturing said weakened area an aperture is formed in said side wall to communicate with the second chamber.

* * * * *